US011820309B1

(12) United States Patent
Faruque et al.

(10) Patent No.: US 11,820,309 B1
(45) Date of Patent: Nov. 21, 2023

(54) PANEL ASSEMBLY DEPLOYABLE FROM SEATBACK

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/065,653

(22) Filed: Dec. 14, 2022

(51) Int. Cl.
    *B60R 21/02*      (2006.01)
    *B60R 21/207*      (2006.01)

(52) U.S. Cl.
    CPC .......... *B60R 21/026* (2013.01); *B60R 21/207* (2013.01); *B60R 2021/0266* (2013.01); *B60R 2021/0273* (2013.01)

(58) Field of Classification Search
    CPC ................ B60R 21/026; B60R 21/207; B60R 2021/0266; B60R 2021/0273
    See application file for complete search history.

(56) References Cited

U.S. PATENT DOCUMENTS

| | | | | |
|---|---|---|---|---|
| 3,397,911 | A * | 8/1968 | Brosius, Sr. ........... | B60N 2/888 297/216.12 |
| 6,030,036 | A * | 2/2000 | Fohl ...................... | B60N 2/888 297/216.12 |
| 6,199,900 | B1 * | 3/2001 | Zeigler .................. | B60N 2/882 297/216.12 |
| 7,086,678 | B2 | 8/2006 | Schlecht | |
| 8,336,909 | B2 | 12/2012 | Lee | |
| 9,682,662 | B2 | 6/2017 | Vinton | |
| 10,035,484 | B2 * | 7/2018 | Jaradi ................. | B60R 21/2338 |
| 10,611,314 | B2 | 4/2020 | Tait | |
| 11,034,323 | B2 * | 6/2021 | Farooq .................. | B60N 3/004 |
| 11,358,554 | B1 * | 6/2022 | Jaradi ................... | B60R 21/231 |
| 2009/0174238 | A1 | 7/2009 | Kuno | |
| 2021/0094503 | A1 * | 4/2021 | Farooq .................. | B60N 3/004 |

* cited by examiner

*Primary Examiner* — Faye M Fleming
(74) *Attorney, Agent, or Firm* — Frank A. MacKenzie; Bejin Bieneman PLC

(57) ABSTRACT

A vehicle includes a vehicle body defining an interior cabin having an occupant cabin and a cargo cabin. A seatback is in the occupant cabin. The seatback has a seatback frame elongated along an upright axis. A panel is elongated along the upright axis of the seatback frame. The panel is slidably engaged with the seatback frame. The panel is slidable relative to the seatback frame along the upright axis from a stowed position to a deployed position. The panel is stowed relative to the seatback frame in the stowed position and elongated away from the seatback frame along the upright axis between the occupant cabin and the cargo cabin in the deployed position. A pyrotechnic actuator is fixed to the seatback frame and operatively engaged with the panel to deploy the panel from the stowed position to the deployed position.

16 Claims, 8 Drawing Sheets

PANEL ASSEMBLY DEPLOYABLE FROM SEATBACK

BACKGROUND

A vehicle may include one or more airbags deployable during certain vehicle impacts to control kinematics of occupants inside the vehicle during the vehicle impact. The airbag may be a component of an airbag assembly including an inflator in communication with the airbag for inflating the airbag from an uninflated position to an inflated position in response to certain vehicle impacts.

DETAILED DESCRIPTION

Figure 1:
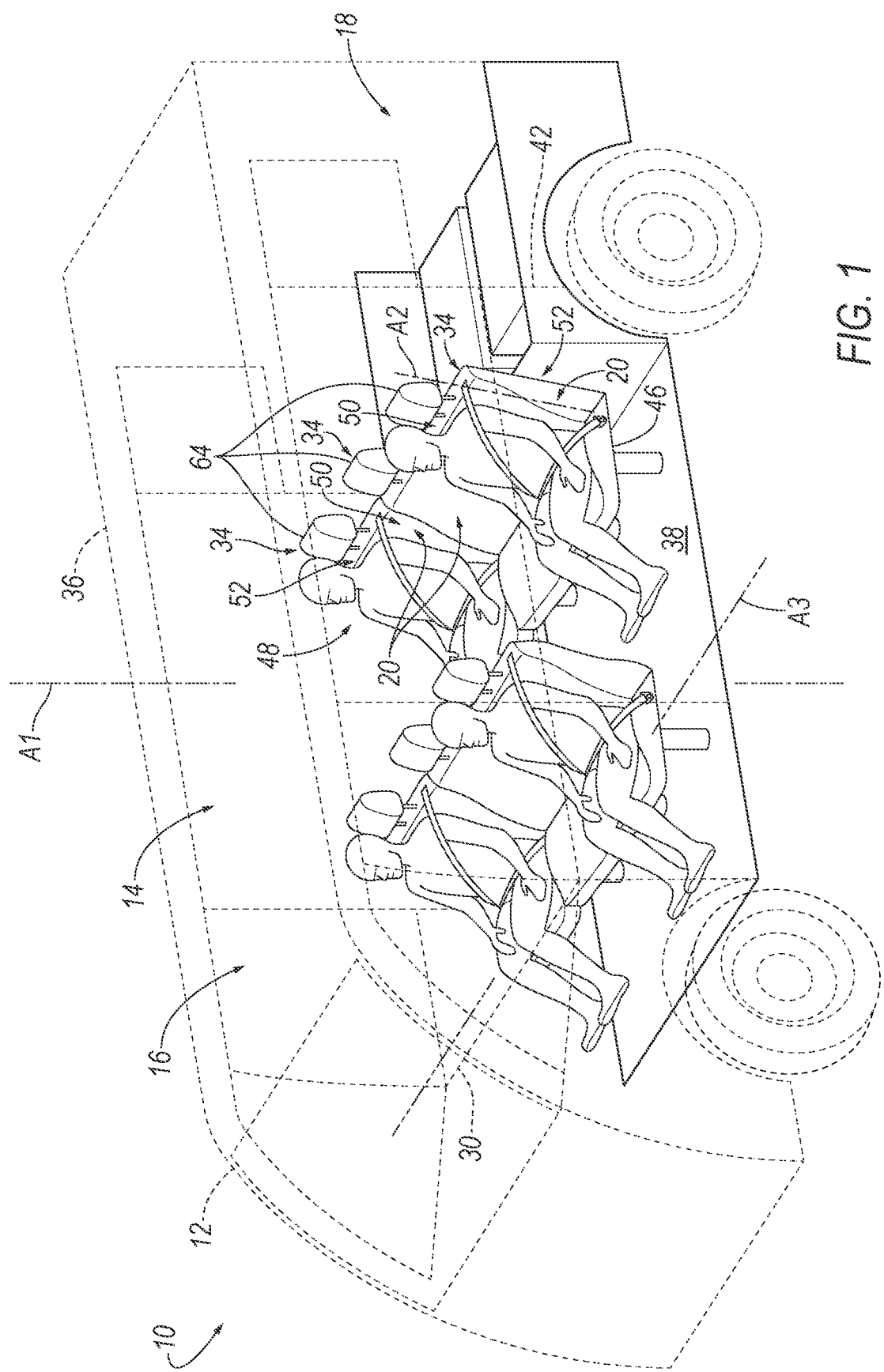
FIG. 1 is a perspective view of a vehicle having an occupant cabin and a cargo cabin with a panel assembly in the stowed position.

A vehicle includes a vehicle body defining an interior cabin having an occupant cabin and a cargo cabin. A seatback is in the occupant cabin. The seatback has a seatback frame elongated along an upright axis. A panel is elongated along the upright axis of the seatback frame. The panel is slidably engaged with the seatback frame. The panel is slidable relative to the seatback frame along the upright axis from a stowed position to a deployed position. The panel is stowed relative to the seatback frame in the stowed position and elongated away from the seatback frame along the upright axis between the occupant cabin and the cargo cabin in the deployed position. A pyrotechnic actuator is fixed to the seatback frame and is operatively engaged with the panel to deploy the panel from the stowed position to the deployed position.

The assembly may include an airbag supported by the panel and the airbag may be inflatable toward the occupant cabin. The panel may be rigid relative to the airbag. The assembly may include a head restraint supported by the seatback. The airbag in the inflated position may have an upper segment above the head restraint and two side segments extending downwardly from the upper segment along the head restraint. The assembly may include an inflator supported on the panel and in fluid communication with the airbag. The assembly may include a computer having a processor and a memory storing instructions executable by the processor to activate the pyrotechnic actuator to move the panel to the deployed position and, after actuating the pyrotechnic actuator, activating the inflator to inflate the airbag to the inflated position.

The assembly may include a track on the seatback frame and elongated along the upright axis. The panel may be moveable along the track along the upright axis from the stowed position to the deployed position.

The assembly may include an inner track fixed to one of the seatback frame and the panel and an outer track fixed to the other of the seatback frame and the panel. The inner track may be slidably engaged with the outer track along the upright axis. In one example, one of the inner track and the outer track includes a spring-loaded pin biased toward the other of the inner track and the outer track, and the other of the inner track and the outer track including a hole configured to receive the spring-loaded pin when the inner track is in the deployed position. The inner track may remain engaged with the outer track when the panel is in the deployed position.

The seatback may include a covering that conceals the panel when the panel is in the stowed position.

The assembly may include a second seatback adjacent the seatback, the second seatback having a second seatback frame elongated along an upright axis, and a second panel elongated along the upright axis of the second seatback frame, the second panel being slidable relative to the second seatback frame along the upright axis from a stowed position to a deployed position. The second panel may be stowed relative to the second seatback frame in the stowed position and elongated away from the second seatback frame along the upright axis of the second seatback frame between the occupant cabin and the cargo cabin in the deployed position. The panel and the second panel may be aligned cross-vehicle between the occupant cabin and the cargo cabin in the deployed position.

The vehicle body may include a roof, the panel extending from the seatback frame towards the roof from the stowed position to the deployed position.

The panel may include an upper end and a lower end, the upper end being in the seatback in the stowed position and spaced from the seatback in the deployed position. The assembly may include a track between the panel and the seatback frame, the panel being slidable along the track from the stowed position to the deployed position, the lower end being engaged with the track in the deployed position.

With reference to the Figures, wherein like numerals indicate like parts throughout the several views, a vehicle 10 includes a vehicle body 12 defining an interior cabin 14 having an occupant cabin 16 and a cargo cabin 18. A seatback 20 is in the occupant cabin 16. The seatback 20 has a seatback frame 22 elongated along an upright axis A2. A panel 24 is elongated along the upright axis A2 of the seatback frame 22. The panel 24 is slidably engaged with the seatback frame 22. The panel 24 is slidable relative to the seatback frame 22 along the upright axis A2 from a stowed position to a deployed position. The panel 24 is stowed relative to the seatback frame 22 in the stowed position and elongated away from the seatback frame 22 along the upright axis A2 between the occupant cabin 16 and the cargo cabin 18 in the deployed position. A pyrotechnic actuator 26 is fixed to the seatback frame 22 and operatively engaged with the panel 24 to deploy the panel 24 from the stowed position to the deployed position.

In response to a vehicle collision, a panel 24 may be deployed from the stowed position to the deployed position above the seatback 20. Since the panel 24 is positioned between the cargo cabin 18 and the occupant cabin 16, the panel 24 in the deployed position retains certain cargo in the cargo cabin 18 to the occupant cabin 16. Specifically, the combination of the seatback 20 and the panel 24 separates the cargo cabin 18 from the occupant cabin 16 may minimize movement of certain cargo from the cargo cabin 18 to occupant cabin 16. When an occupant is urged in a direction toward the seatback 20, the movement of the occupant is restrained by the seatback 20.

In some examples, including the example shown in the Figures, an airbag 28 is supported on the panel 24 and moves with the panel 24 from the stowed position to the deployed position. In such examples, the airbag 28 inflates from the panel 24 vehicle-forward of the panel 24 in the occupant cabin 16 to control the kinematics of an occupant of the vehicle 10 in the occupant cabin 16.

Figure 2:
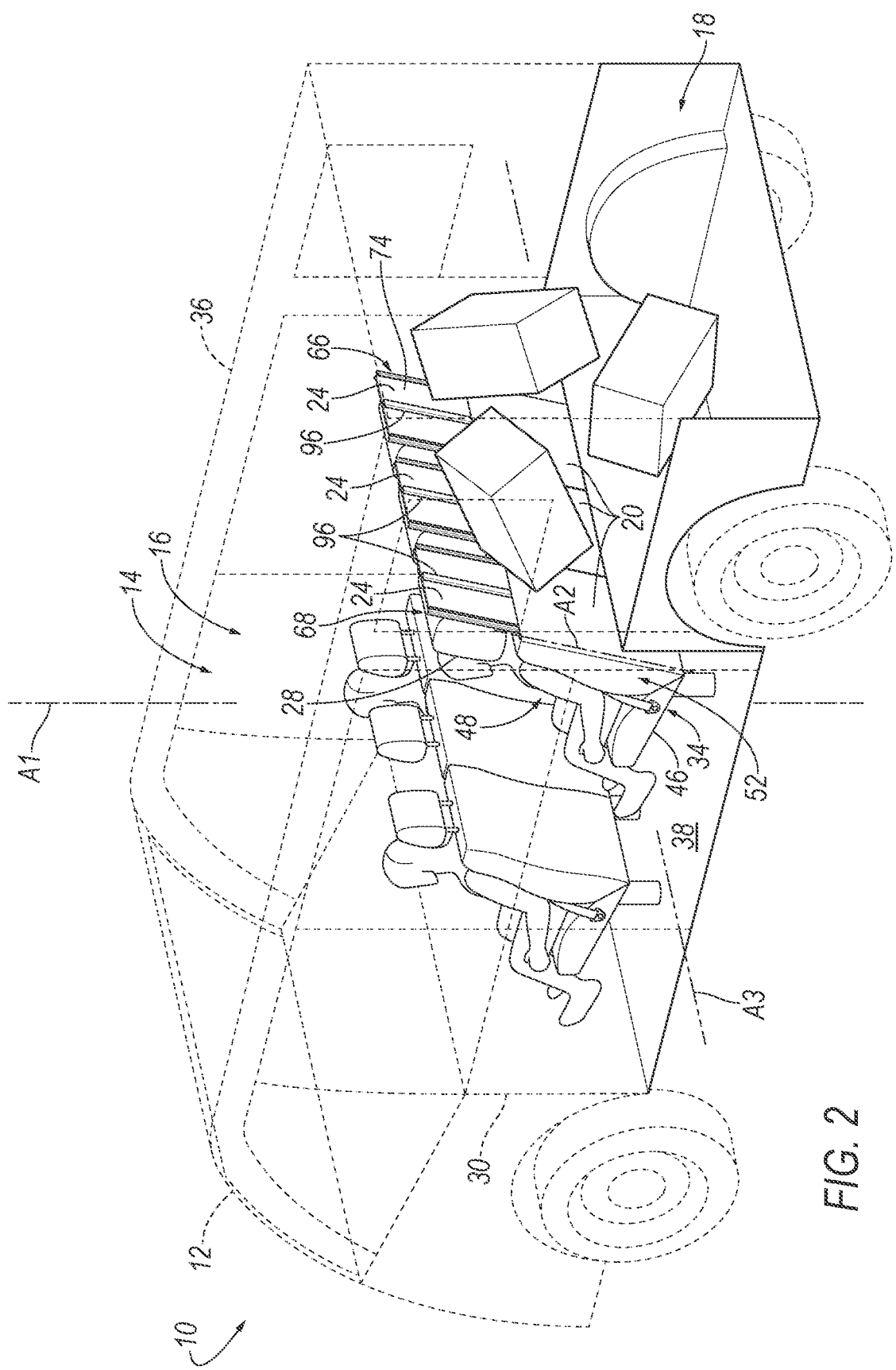
FIG. 2 is a perspective view of the vehicle having the panel assembly in the deployed position and the airbag in an inflated position.
Figure 3:
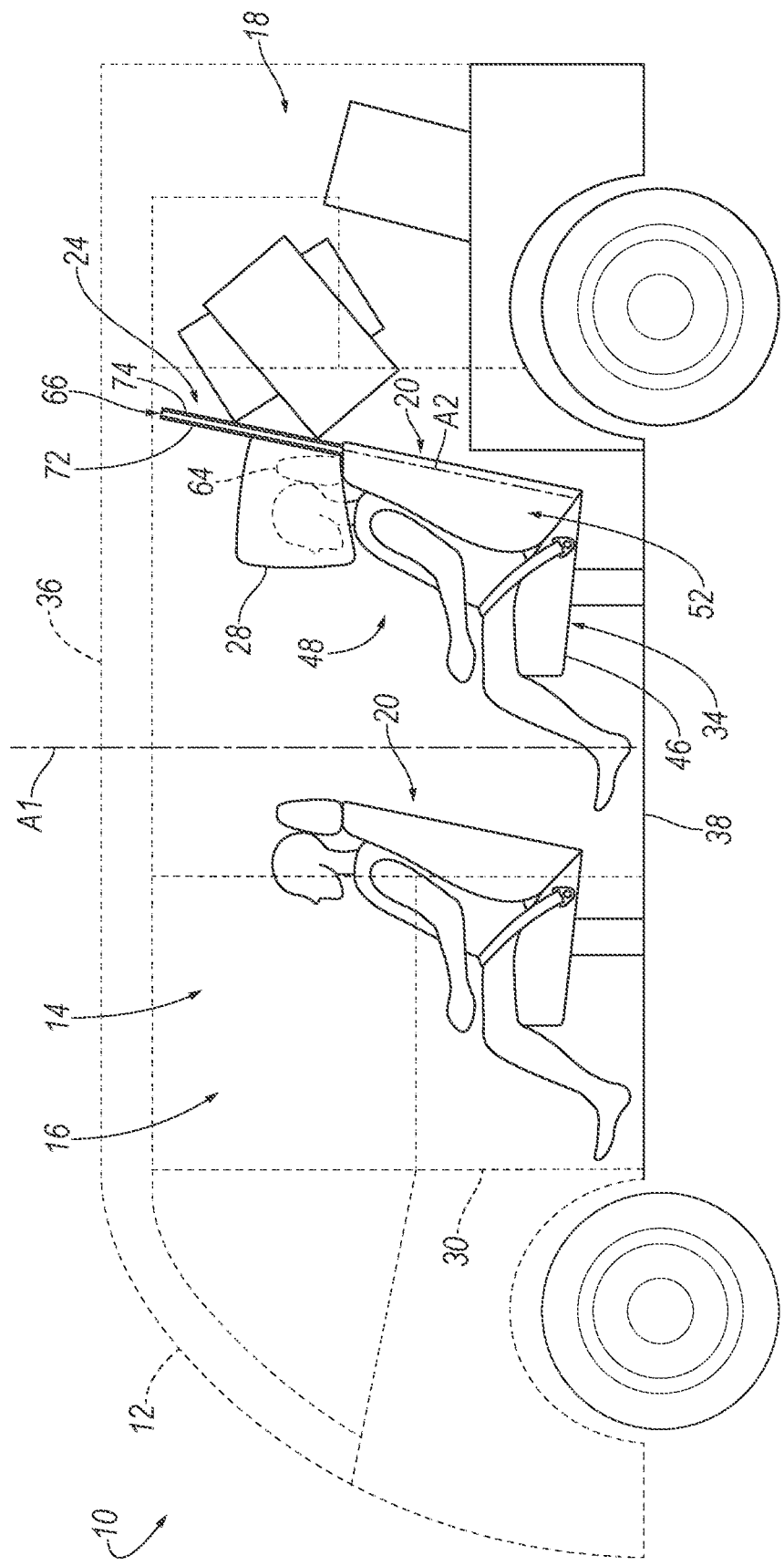
FIG. 3 is a side view of the vehicle with the panel assembly in the deployed position and the airbag in an inflated position.
Figure 4:
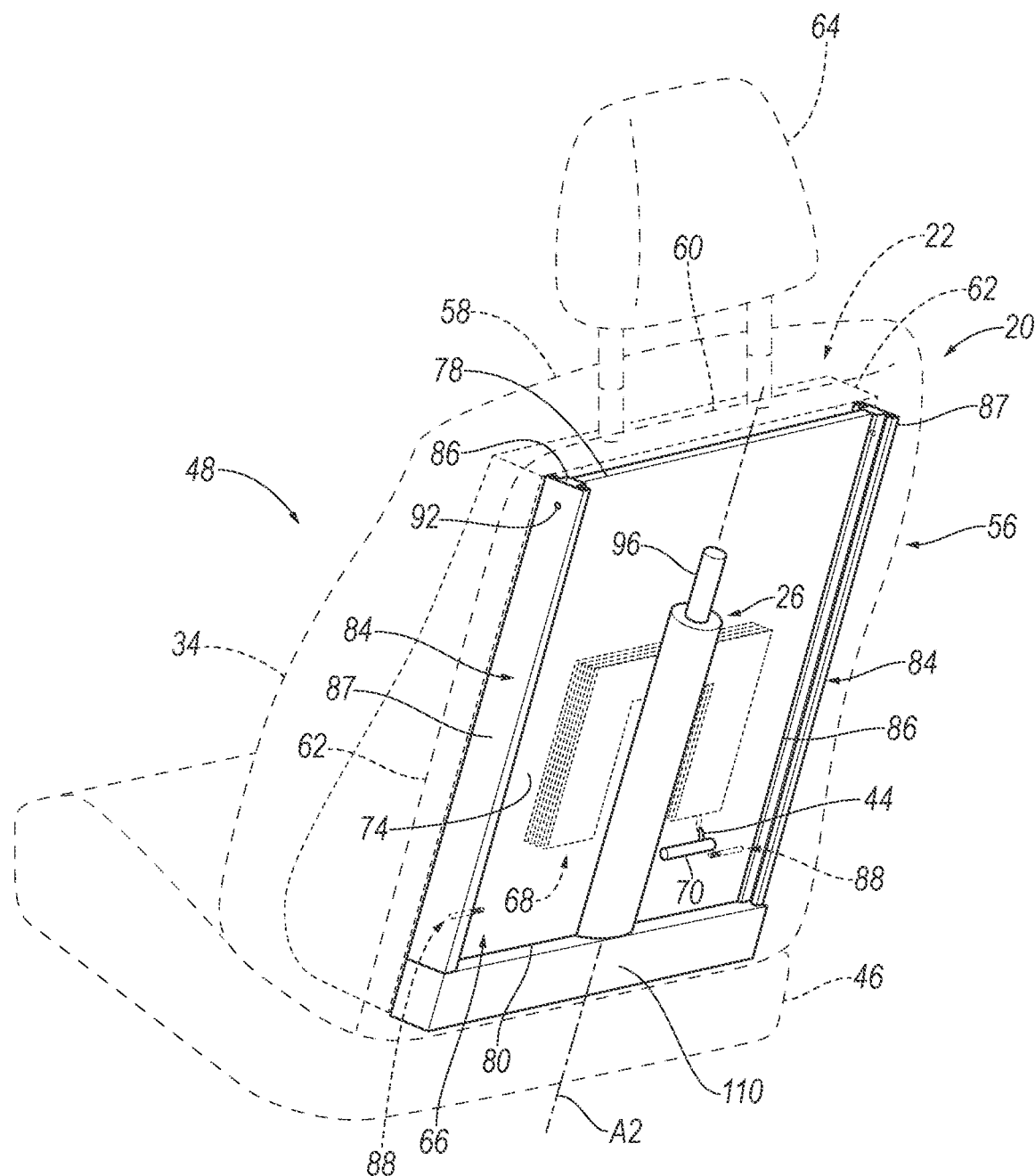
FIG. 4 is a perspective view of the seat with the panel assembly in the undeployed position and an airbag in an uninflated position.
Figure 5:
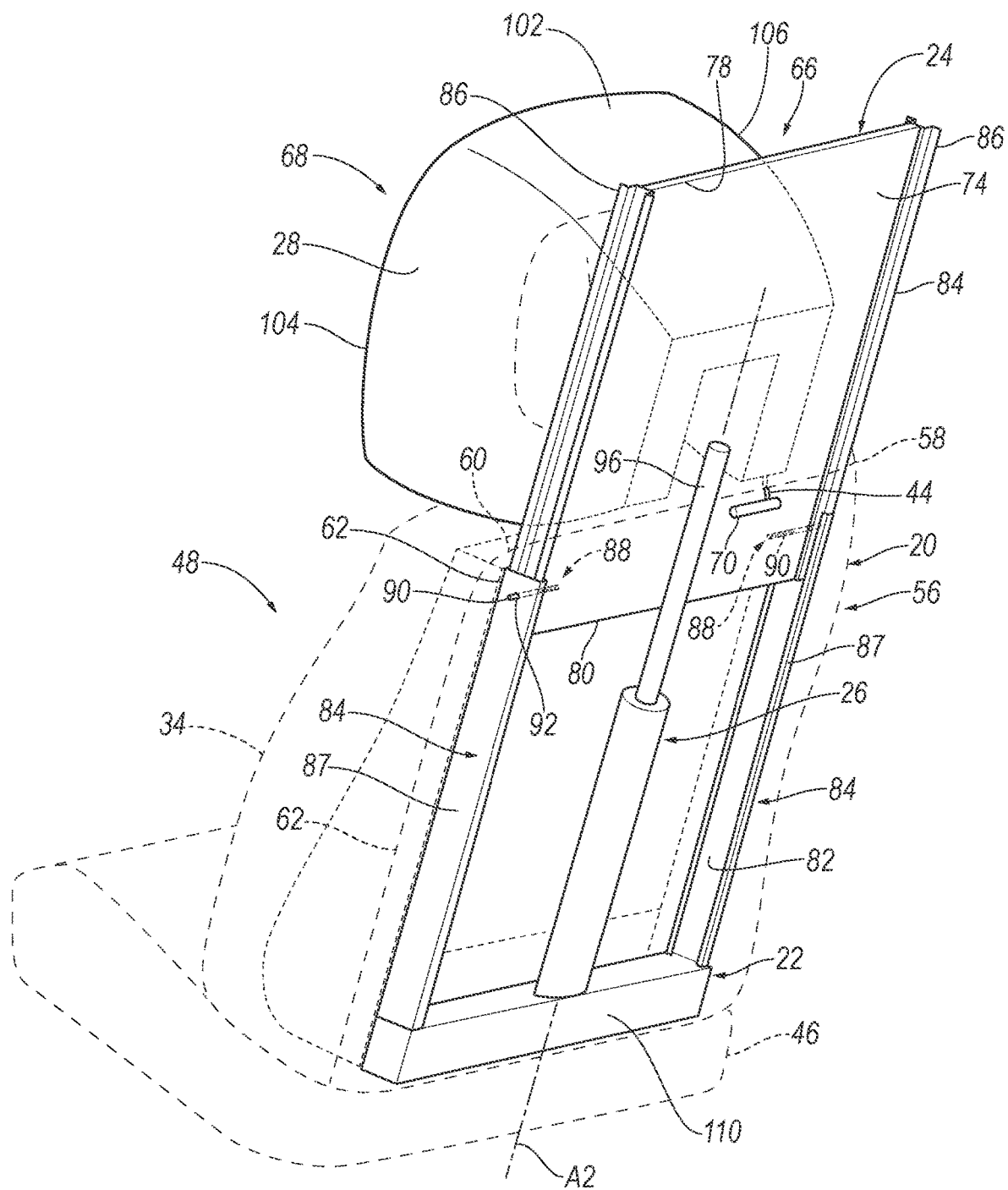
FIG. 5 is a perspective view of the seat with the panel assembly in the deployed position and the airbag in an inflated position.
Figure 6:
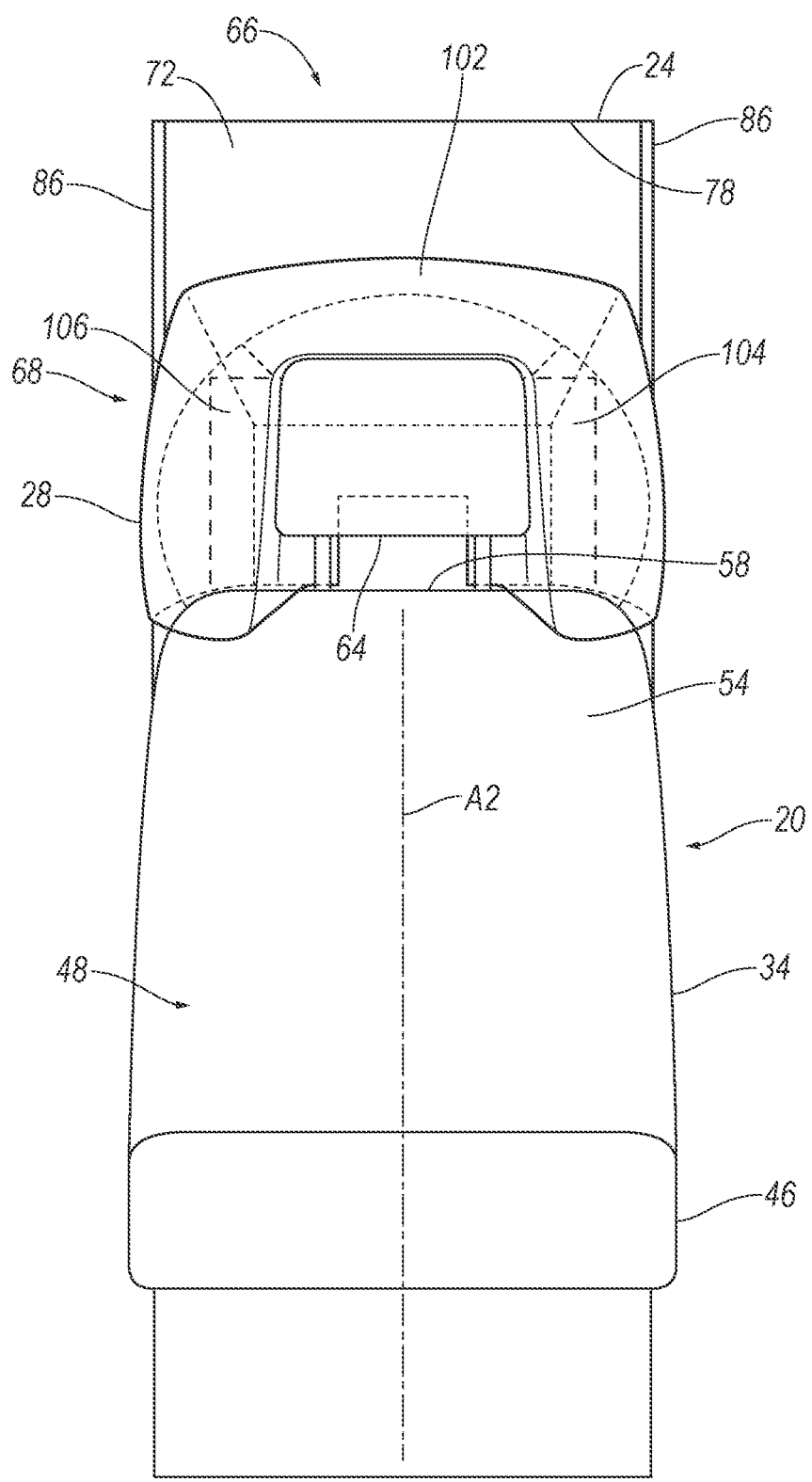
FIG. 6 is a front view of the seat with the panel assembly in the deployed position and the airbag the inflated position.

With reference to FIGS. 1-2, the vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from the driver, i.e., the vehicle 10 may be self-driving without human input.

The vehicle body 12 may be of a unibody construction in which the vehicle body 12 is unitary with a vehicle frame (including frame rails, pillars 42, roof rails, etc.). As another example, the body and frame may have a body-on-frame construction (also referred to as a cab-on-frame construction) in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The vehicle body 12 defines the interior cabin 14. The interior cabin 14 extends across the vehicle 10, i.e., from one side of the vehicle 10 to the other side of the vehicle 10. The interior cabin 14 includes a front end and a rear end with the front end being in front of the rear end during forward movement of the vehicle 10. The interior cabin 14 is divided into the occupant cabin 16 and the cargo cabin 18. The occupant cabin 16 may be at the front end of the interior cabin 14 and the cargo cabin 18 is at the rear end of the interior cabin 14, as shown in the example in the Figures.

The occupant cabin 16 houses occupants, if any, of the vehicle 10. The occupant cabin 16 may extend across the vehicle 10, i.e., from one side to the other side of the vehicle 10. The occupant cabin 16 may include a front end and a rear end. The vehicle 10 may include an instrument panel 30 and vehicle controls at the front end of the occupant cabin 16. The vehicle 10 includes seats in the occupant cabin 16, as set forth further below.

The cargo cabin 18 is designed to stow cargo, if any, in the vehicle 10. The cargo cabin 18 may extend across the vehicle 10, i.e., from one side to the other side of the vehicle 10. The cargo cabin 18 may include a front end and a rear end. As an example, shown in the Figures, the vehicle 10 may include a liftgate (not shown) at the rear end of the cargo cabin 18.

The occupant cabin 16 and the cargo cabin 18 are adjacent each other. As shown in the Figures, the rear end of the occupant cabin 16 is adjacent the front end of the cargo cabin 18. The occupant cabin 16 and the cargo cabin 18 may be adjustable relative to each other. In other words, the interior cabin 14 may be configurable to adjust the size of the occupant cabin 16 and the cargo cabin 18, relative to each other. As an example, the vehicle 10 may have a rear seat 34, as described further below. The rear seat 34 may be adjustable, e.g., foldable, such that the rear seat 34 has an upright position and a folded position. In the upright position, an occupant can occupy the rear seat 34 in a seated position. In the folded position, a back of the seatback 20 defines a lower boundary of the interior cabin 14. When the rear seat 34 is in the upright position, the portion of the interior cabin 14 with the rear seat 34 is the occupant cabin 16. When the rear seat 34 is in the folded position, the same portion of the interior cabin 14 is the cargo cabin 18.

The vehicle body 12 includes a roof 36 and a floor 38. The roof 36 may define the upper boundary of the vehicle body 12 and may extend from the front end of the interior cabin 14 to the rear end of the interior cabin 14. The occupant cabin 16 and the cargo cabin 18 are below the vehicle roof 36. The floor 38 is below the roof 36. The floor 38 may define the lower boundary of the vehicle body 12 and may extend from the front end of the interior cabin 14 to the rear end of the interior cabin 14. The occupant cabin 16 and the cargo cabin 18 are above the vehicle floor 38. The seats, including rear seats 34, are supported by the floor 38. For example, the seats may be directly mounted to the floor 38.

The vehicle 10 includes at least one door (not shown) openable relative to the vehicle body 12 for occupants to enter and exit the occupant cabin 16. In the example shown in the Figures, the vehicle 10 includes a front door and a rear door. In such an example, the front door provides access to the front end of the occupant cabin 16 and the rear door provides access to the rear end of the occupant cabin 16.

The vehicle body 12 may include pillars 42. The pillars 42 may extend from the roof 36 to the floor 38. Specifically, the vehicle body 12 may include pillars 42 on both sides of the vehicle 10. In the example shown in the Figures, each side of the vehicle 10 includes a front pillar 42, a middle pillar 42, and a rear pillar 42. The front pillars 42 may extend between the windshield and the front doors. In other words, the front pillars 42 may be disposed at the front end of the interior cabin 14. The middle pillars 42 may extend between the front door and the rear door, i.e., between adjacent doors. The vehicle 10 may include additional pillars 42.

As set forth above, the vehicle 10 includes one or more seats in the occupant cabin 16. The seats may be arranged in any suitable arrangement in the occupant cabin 16. In the examples shown in the Figures, one or more of the seats may be at the front end of the occupant cabin 16, i.e., a front seat, and one or more of the seats may be at the rear end of the occupant cabin 16, i.e., a rear seat 34. The rear seat 34 is in the occupant cabin 16 and adjacent the cargo cabin 18. As shown in the Figures, the rear seats 34 may be or be in a rear row of seats. As an example, the vehicle 10 may include more than one rear seat 34 arranged cross-vehicle. In another example, the rear seat 34 may be elongated cross-vehicle across the occupant cabin 16 from one side to the other side of the vehicle 10 and may define multiple occupant-seating areas 48 positioned cross-vehicle. The rear seat(s) 34 may be any suitable type, e.g., bench seats, bucket seats, etc.

Each seat includes the seatback 20 and a seat bottom 46. The seatback 20 may be supported by the seat bottom 46 and may be stationary or movable relative to the seat bottom 46. Specifically, the seatback 20 may be fixed relative to the seat bottom 46 in the upright position or moveable relative to the seat bottom 46 to the upright position. The upright position is a position of the seatback 20 that supports an occupant in a seated position. As an example, the seatback 20 in the upright position may elongated be within 30 degrees of parallel to a vertical axis A1. In some examples, the seatback 20 is rotatable from the upright position to the folded position (described above), in which case the seatback 20 is elongated generally horizontal. In some examples, the seatback 20 is rotatable from the upright position to a reclined position in which the seatback 20 is elongated between 30 degrees of parallel and horizontal. In examples including rows of seats, e.g., the rear row of seats, the seatbacks 20 of adjacent seats in the row are adjacent each other and arranged cross-vehicle. Common numerals are used to identify common features of the seats in the Figures.

The seats each include an inboard side 50 and an outboard side 52 spaced from each other in the cross-seat direction, e.g., in a cross-vehicle direction when the seat is forward facing. The seatback 20 includes a front extending from the inboard side 50 to the outboard side 52 and a rear extending from the inboard side 50 to the outboard side 52. As shown in the Figures, when the seatback 20 is forward-facing in the upright position, the front 54 of the seatback 20 faces vehicle forward and the rear 56 of the seatback 20 faces vehicle rearward. When the seatback 20 is in the folded position, the front 54 of the seatback 20 faces the floor 38, i.e., abuts the seat bottom 46, and the rear 56 of the seatback 20 faces the roof 36.

The seat includes an occupant-seating area 48. Specifically, the seatback 20 and the seat bottom 46 define the occupant-seating area 48. The occupant-seating area 48 is in a seat-forward direction of the seatback 20 and above the seat bottom 46. Specifically, the seatback 20 defines the occupant-seating area 48 between the inboard side 50 and the outboard side 52. The front 54 of the seatback 20 between the inboard side 50 and the outboard side 52 defines the occupant-seating area 48. The occupant-seating area 48 is the area occupied by an occupant when properly seated on the seat.

The seatback 20 includes a top 58 between the inboard side 50 and the outboard side 52. Specifically, the top 58 extends from the inboard side 50 to the outboard side 52. The seatback 20 is elongated from the seat bottom 46 to the top 58 of the seatback 20. In other words, as shown in the Figures, the top 58 may terminate at the inboard side 50 and the outboard side 52.

The seatback 20 includes the seatback frame 22 and a covering 60 supported on the seatback frame 22. The seatback frame 22 may include tubes, beams, etc. Specifically, the seatback frame 22 includes a pair of upright frame members. The upright frame members 62 are spaced from each other and the seatback frame 22 includes at least one cross-beam 110 extending between the upright frame members 62. The seatback frame 22, including the upright frame members 62, may be of any suitable metal (e.g., steel, aluminum, etc.), plastic material (e.g., carbon fiber reinforced plastic (CFRP), glass fiber-reinforced semi-finished thermoplastic composite (organosheet), etc.), etc. The covering 60 may include upholstery and padding. The upholstery may be cloth, leather, faux leather, or any other suitable material. The upholstery may be stitched in panels around the frame. The padding may be between the covering 60 and the seatback frame 22 and may be foam or any other suitable material. The covering 60 conceals the panel 24 when the panel 24 is in the stowed position.

As set forth above, the seatback 20, and specifically the seatback frame 22, is elongated along the upright axis A2 when the seatback 20 is in the upright position. Specifically, the upright frame members 62 of the seatback frame 22 are elongated along the upright axis A2 when the seatback 20 is in the upright position. As described above, in the upright position, the seat may be occupied by an occupant and the seatback 20 supports the occupant in the seated position. The top 58 of the seatback 20 is above the seat bottom 46 in the upright position. In the examples shown in the Figures, the rear seats 34 are in the upright position.

The seat may include a head restraint 64. In the example shown in the Figures, the head restraint 64 is supported by the seatback 20. Specifically, the head restraint 64 is supported on the top 58 the seatback 20.

The seat includes a panel assembly 66. The panel assembly 66 includes the panel 24 and the pyrotechnic actuator 26 and may include an airbag assembly 68. The airbag assembly 68 includes the airbag 28 and an inflator 70, as described further below. During a vehicle collision, the pyrotechnic actuator 26 moves the panel 24 upwardly along from the stowed position to the deployed position. In the deployed position, the panel 24 is between the occupant cabin 16 and the cargo cabin 18. In other words, in the deployed position, the panel 24 divides the occupant cabin 16 and the cargo cabin 18.

The seat may include more than one panel assembly 66. For example, in examples including more than one rear seat 34, each rear seat 34 may include one panel assembly 66. In the example shown in the Figures, the vehicle 10 includes three rear seats 34 and each of the rear seats 34 includes one panel assembly 66. In examples including more than one panel assembly 66, the panel assemblies 66 may be identical or similar (e.g., varying in size to accommodate differences in different areas of the occupant cabin 16. Common numerals are used to identify common features of the panel assemblies 66.

The panel 24 may be planar. Specifically, the panel 24 has an occupant side 72 and a cargo side 74 that are each planar in a plane generally along the upright axis A2 and the cross-vehicle axis A3. The occupant side 72 faces vehicle-forward when the seat is forward-facing and the cargo side 74 faces vehicle-rearward when the seat is rearward-facing.

The panel 24 is rigid to minimize movement of certain cargo from the cargo cabin 18 to the occupant cabin 16 when the panel 24 is in the deployed position. The rigidity of the panel 24 allows the panel 24 to resist certain deformation if impacted by some objects in the cargo cabin 18 that are urged vehicle-forward in the event of a sudden deceleration of the vehicle 10 during certain vehicle impacts. The panel 24 may be of any suitable material that is rigid to resist certain deformation if impacted by certain cargo, e.g., metal, plastic, etc.

The panel 24 is rigid relative to the airbag 28. Specifically, the panel 24 acts as a reaction surface for the airbag 28 when the panel 24 is in the deployed position and the airbag 28 is in the inflated position. The panel 24 may be of any suitable material that is rigid relative to the airbag 28, e.g., metal, plastic, etc. The rigidity of the panel 24 relative to the airbag 28 allows the panel 24 to act as a reaction surface for the airbag 28 in the inflated position.

The panel 24 is elongated along the upright axis A2. In other words, the longest dimension of the panel 24 is along the upright axis A2. The panel 24 may be elongated along the upright axis A2 in both the stowed position and the deployed position, as shown in the example in the Figures.

The panel 24 is stowed relative to the seatback frame 22 in the stowed position. Specifically, the seatback frame 22 may define a cavity to house the panel 24 in the stowed position and the airbag 28 in an uninflated position, as described further below. The covering 60 may define an upper boundary of the cavity.

The panel 24 includes an upper end 78 and a lower end 80. The upper end 78 is above the lower end 80. Specifically, the upper end 78 is spaced from the lower end 80 along the upright axis A2. The panel 24 may terminate at the upper end 78 and the lower end 80. The upper end 78 is in the seatback 20 in the stowed position. Specifically, the upper end 78 may be below the covering 60 of the seatback 20 in the stowed position. The covering 60 may conceal the panel 24 when the panel 24 is in the stowed position. The upper end 78 is spaced from the seatback 20 in the deployed position. Specifically, the upper end 78 of the panel 24 is above the seatback 20 in the deployed position, e.g., along the upright axis A2. The lower end 80 of the panel 24 remains engaged with the seatback 20 in the deployed position, e.g., engaged with tracks 84 as described further below.

In the deployed position, the panel 24 extends from the seatback frame 22 towards the roof 36. Specifically, the panel 24 is elongated from the seatback frame 22 towards the roof 36 in the deployed position. The panel 24 is positioned between the seatback 20 and the roof 36 to minimize passage of certain cargo from the cargo cabin 18 to the occupant cabin 16 during certain vehicle impacts. The upper end 78 of the panel 24 is adjacent the roof 36 in the deployed position, i.e., with nothing between the upper end 78 of the panel 24 and the roof 36. The panel 24 in the deployed position may extend from the seatback 20 more than half the distance between the seatback 20 the roof 36. Specifically, the upper end 78 of the panel 24 may be closer to the roof 36 than the seatback 20 in the deployed position. In some examples, the panel 24 from the seatback 20 to the upper end 78 may span more than 90 percent of the space between the seatback 20 and the roof 36. The upper end 78, for example may be within 6-12 inches from the roof 36 in the deployed position.

In the undeployed position, the panel 24 is elongated vertically along the seatback 20. In the undeployed position, the panel 24 may extend below a vertical midline of the seatback 20. For example, as shown in the example in the Figures, the panel 24 in the undeployed position extends to a lowermost cross-beam 110 of the seatback frame 22. In the undeployed position, the bottom of the panel 24 may be aligned in a common vertical plane with the seat bottom 46. The tracks 84 may extend downwardly to the bottom of the panel 24 in the undeployed position.

The panel 24 is slidably engaged with the seatback frame 22. Specifically, the panel 24 is slidable relative to the seatback frame 22 along the upright axis A2 from the stowed position to the deployed position. For example, the seat may include a track 84 between the panel 24 and the seatback 20. Specifically, the track 84 may be between the panel 24 and the seatback frame 22. The track 84 may be supported by the seatback 20 and may move as a unit with the seatback 20. Specifically, the track 84 may be fixed to the seatback 20 directly or indirectly, i.e., through an intermediate component. The track 84 may be elongated along the upright axis A2 and the panel 24 may be moveable along the track 84 along the upright axis A2 from the stowed position to the deployed position.

The tracks 84 may be concealed from the interior cabin 14 when the panel 24 is in the stowed position. For example, the covering 60 of the seatback 20 may cover the track 84 in the interior cabin 14. In such examples, the covering 60 is releasable relative to the seatback 20 during deployment of the panel 24 from the stowed position to the raised position.

The seat may, for example, include two tracks 84, i.e., a first track and a second track, spaced from each other cross-seat. The adjective "first" and "second" are used with respect to the tracks 84 as identifiers do not indicate order or importance.

The track 84 is rigid relative to the panel 24 to withstand certain deformation if impacted by certain cargo in the cargo cabin 18 during certain vehicle impacts. The track 84 is designed to withstand certain deformation if impacted by certain cargo in the cargo cabin 18 during certain vehicle impacts. As an example, the track 84 may include nesting components that provide rigidity. For example, the track 84 may include an inner track 86 fixed to one of the seatback frame 22 and the panel 24 and an outer track 87 fixed to the other of the seatback frame 22 and the panel 24. In such examples, the inner track 86 is slidably engaged with the outer track 87 along the upright axis A2. In the example shown in the Figures, the outer track 87 is fixed to the seatback frame 22, i.e., moves as a unit with the seatback frame 22, and the inner track 86 is fixed to the panel 24, i.e., moves as a unit with the panel 24.

The inner track 86 and the outer track 87 are slideably engaged with each other. As an example, the outer track 87 may have a channel 82, e.g., a U-shaped channel 82, and the inner track 86 may be retained in the channel 82 and slideable relative to the channel 82 along the upright axis A2. The track 84 may include bearing or other friction-reducing components between the inner track 86.

The inner track 86 remains engaged with the outer track 87 when the panel 24 is in the deployed position. The inner track 86 and/or the outer track 87 may include features to retain engagement between the inner track 86 and the outer track 87 in the deployed position. As one example, the track 84 may include a lock 88 that stops relative movement between the inner track 86 and the outer track 87 in the deployed position to prevent relative overextension between the inner track 86 and the outer track 87 that would otherwise result in disengagement of the inner track 86 and the outer track 87 in the deployed position. For example, a spring-loaded pin 90 is supported by one of the inner track 86 and the outer track 87 and is biased toward the other of the inner track 86 and the outer track 87, and the other of the inner track 86 and the outer track 87 may include a hole 92 configured to receive the spring-loaded pin 90 when the track 84 is in the deployed position.

In the example shown in the Figures, the spring-loaded pin 90 is supported on the inner track 86 and the outer track 87 includes the hole 92. In such an example, the spring-loaded pin 90 is in a cavity 94 of the inner track 86. In that example, the spring-loaded pin 90 abuts the outer track 87 and the outer track 87 depresses the spring-loaded pin 90 into the cavity 94. The spring-loaded pin 90 rides along the outer track 87 upwardly as the inner track 86 moves toward the deployed position along the upright axis A2. When the spring-loaded pin 90 reaches the hole 92, the spring 108 biases the spring-loaded pin 90 into the hole 92 to prevent further relative movement of the inner track 86 and the outer track 87. The lock 88, when engaged, is designed to prevent movement of the panel 24. Specifically, the locking device locks the panel 24 in the deployed position, i.e., to prevent overextension of the inner track 86 and the outer track 87 and to prevent movement of the panel 24 downwardly from the deployed position under the force of gravity, rebound from extension of the panel 24 to the deployed position, etc.

The pyrotechnic actuator 26 deploys the panel 24 from the stowed position to the deployed position. Specifically, the pyrotechnic actuator 26 is activated by a computer 114 of the vehicle 10, e.g., a restraints control module, as described further below. In the example shown in the Figures, the pyrotechnic actuator 26 pushes the panel 24 from the stowed position to the deployed position. In other examples, the pyrotechnic actuator 26 may pull the panel 24 from the stowed position to the deployed position.

Figure 7:
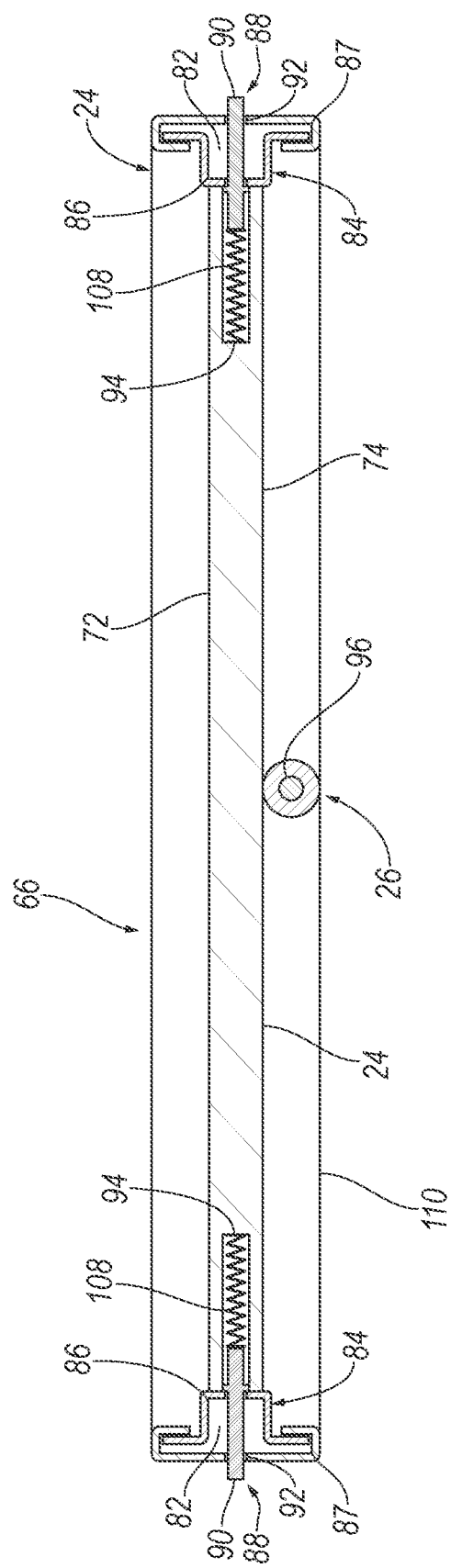
FIG. 7 is a cross-sectional view of the panel assembly isolated from the seat.

The pyrotechnic device may be, for example, a rotary actuator or a linear actuator. As an example shown in the Figures, the pyrotechnic actuator 26 includes a pyrotechnic charge (not shown). Specifically, the pyrotechnic actuator 26 includes a cylinder (not numbered) and a piston 96 having a first end in the cylinder and a second end outside the cylinder. The pyrotechnic actuator 26, including the piston 96, is shown schematically in FIG. 7. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic actuator 26 is fixed to the seatback frame 22. The pyrotechnic actuator 26 may be fixed to the seatback 20 at any suitable point on the seatback 20. As an example, shown in the Figures, the pyrotechnic actuator 26 is fixed to the seatback 20 below the panel 24. Specifically, in this example, the pyrotechnic actuator 26 is positioned on the cross-beam 110. The pyrotechnic actuator 26 moves as a unit with the seatback frame 22. As an example, the pyrotechnic actuator 26 may be fixed to the seatback frame 22 with threaded fasteners, clips, brackets, etc.

The pyrotechnic actuator 26 is operatively engaged with the panel 24 to deploy the panel 24 from the stowed position to the deployed position. When the pyrotechnic actuator 26 is activated, as described below, the pyrotechnic actuator 26 moves the panel 24 from the stowed position to the deployed position. The first end of the piston 96 is directly or indirectly engaged with the pyrotechnic charge in the cylinder. The second end of the piston 96 is directly or indirectly engaged with the panel 24. Specifically, in the example shown in the Figures, the piston 96 is engaged with the bottom of the panel 24. In a vehicle collision, the pyrotechnic charge drives the piston 96 upward, moving the panel 24 from the stowed position to the deployed position. Specifically, in the example shown in the Figures, the pyrotechnic actuator 26 slides the panel 24 along the tracks 84.

In examples including more than one panel assembly 66, the panels 24 are aligned cross-vehicle between the occupant cabin 16 and the cargo cabin 18 in the deployed position. In other words, the panels 24, when in the deployed position, in combination extend across the occupant cabin 16 in the cross-vehicle direction. The panels 24, in combination may be elongated cross-vehicle generally perpendicular to a longitudinal axis of the vehicle 10. In such examples, adjacent panels 24 may be slightly spaced cross-vehicle, i.e., spaced at a distance that minimizes the opportunity for travel of certain cargo therebetween from the cargo cabin 18. In other examples, the adjacent panels 24 may abut each other cross-vehicle and/or may overlap.

As discussed above, the airbag 28 is supported by the panel 24. As shown in the Figures, the airbag 28 is directly supported on the panel 24, i.e., the weight of the airbag 28 is entirely supported by the panel 24. When the panel 24 is in the stowed position the airbag 28 is in the uninflated position. The airbag 28 moves as a unit with the panel 24 as the panel 24 moves from the stowed position to the deployed position. In the event of certain impacts to the vehicle 10, after the panel 24 is deployed to the deployed position, the airbag 28 may be inflated. In other words, the airbag 28 being inflatable toward the occupant cabin 16 from the uninflated position to the inflated position when the panel 24 is in the deployed position. The airbag 28 may be fixed to the panel 24 in any suitable fashion, e.g., with threaded fasteners, clips, brackets, etc.

The airbag assembly 68 includes the airbag 28 and the inflator 70. As described further below, the airbag assembly 68, i.e., the airbag 28 and the inflator 70, may move as a unit with the panel 24 from the stowed position to the deployed position.

The airbag 28 is inflatable above the seatback 20 when the panel 24 is in the deployed position. In the example where the vehicle 10 includes the first seat and the second seat, the airbag 28 is inflatable to the inflated position above the seatbacks 20 of the first seat and the second seat. Specifically, the airbag 28 extends vehicle-forward above the top 58 of the seatback 20 in the inflated position. The airbag 28 may extend vehicle-forward beyond the front 54 of the seatback 20 in the inflated position. In examples where the seat includes the head restraint 64, the airbag 28 is inflatable around the head restraint 64. Specifically, the airbag 28 may inflate vehicle-forward on an inboard and an outboard side 52 of the head restraint 64. In such an example, the airbag 28 is continuous from the inboard side 50 of the head restraint 64 to the outboard side 52 of the head restraint 64. The airbag 28 may extend vehicle-forward beyond the head restraint 64. In the event of certain vehicle impacts, the airbag 28 may inflate to the inflated position to control kinematics of occupants seated in the seats of the vehicle 10.

As set forth above, the airbag 28 is inflatable forward toward the head restraint 64. In other words, the airbag 28 deploys in the direction the occupant-seating area 48. In the inflated position, the airbag 28 may partially surround a portion of the occupant-seating area 48. As set forth above, the airbag 28 is inflatable around the head restraint 64. In other words, the airbag 28 deploys in the direction of the occupant-seating area 48.

The airbag 28 may include multiple segments. Specifically, as an example shown in the Figures, the airbag 28 includes an upper segment 102 above the head restraint 64 and two side segments i.e., a first side segment 104 and a second side segment 106, extending downwardly from the upper segment 102 along the head restraint 64. As shown in the Figures, the upper segment 102 extends vehicle-forward from the panel 24 above the head restraint 64 toward the front end of the occupant cabin 16. In the inflated position, the upper segment 102 extends over an occupant in the occupant-seating area 48. The first side segment 104 extends forward from the panel 24 along the head restraint 64 above the first side of the seatback 20. In the inflated position the first side segment 104 extends downwardly toward the seat bottom 46 along the front 54 of the seatback 20 and extends forward toward the instrument panel 30. The second side segment 106 extends forward from the panel 24 along the head restraint 64 above the second side of the seatback 20. In the inflated position the second side segment 106 extends downwardly toward the seat bottom 46 along the front 54 of the seatback 20 and extends forward toward the front end of the occupant cabin 16.

The airbag 28 includes at least one inflation chamber. During inflation of the airbag 28 from the uninflated position to the inflated position, the inflation chamber is filled with an inflation medium, described further below. Specifically, the upper segment 102, the first side segment 104, and the second side segment 106 may each define an inflation chamber, respectively. Alternatively, the upper segment 102, the first side segment 104 and the second side segment 106 may share the inflation chamber. In other words, the inflation chamber is common to the upper segment 102, the first side segment 104 and the second side segment 106. In this example, the airbag 28 may be unitary, i.e., the airbag 28 is a single, uniform piece of material with no seams, joints, fasteners, or adhesives, e.g., is one-piece woven. The airbag 28 may include internal tethers, i.e., within the inflation chamber, to control deployment of the upper segment 102, the first side segment 104, and the second side segment 106.

The airbag 28 may be fabric, e.g., a woven polymer. For example, the fabric may be woven nylon yarn, e.g., nylon 66. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 70 may be supported on the panel 24. The inflator 70 may move with the panel 24 as the panel 24 moves from the stowed position to the deployed position. As shown in the Figures, the inflator 70 may be supported on the cargo side 74 of the panel 24. In another example, the inflator 70 may be supported on the occupant side 72 of the panel 24. In another example, not shown in the Figures, the inflator 70 may be supported on the seatback frame 22. The inflator 70 may be fixed to the panel 24 in any suitable fashion, e.g., with threaded fasteners, clips, brackets, etc.

The inflator 70 is in fluid communication with the airbag 28. The inflator 70 expands the airbag 28 with the inflation medium, such as a gas, to move the airbag 28 from the uninflated position to the inflated position. The inflator 70 may be, for example, a pyrotechnic inflator 70 that ignites a chemical reaction to generate the inflation medium, a stored gas inflator 70 that releases (e.g., by a pyrotechnic valve) stored gas as the inflation medium, or a hybrid. The inflator 70 may be, for example, connected to the inflation chamber via fill tubes 44 or may be at least partially in the inflation chamber to deliver the inflation medium directly to the inflation chamber. In the example where the inflator 70 is supported on the seatback frame 22, the fill tubes 44 may be longer than in the example where the inflator 70 is supported on the panel 24.

The vehicle 10 may include at least one impact sensor 118 and at least one seat position sensor 116 in communication with the inflator 70 and/or the actuator. The impact sensor 118 is designed to detect certain impacts to the vehicle 10. The inflator 70 may be activated based on certain detected impacts. The actuator may be activated based on certain detected impacts. The impact sensor 118 may be of any suitable type, for example, post-contact sensors such as accelerometers, pressure sensors, and contact switches; and pre-impact sensors 118 such as radar, LIDAR, and vision-sensing systems. The vision systems may include one or more cameras, CCD image sensors, CMOS image sensors, etc. The impact sensor 118 may be located at numerous points in or on the vehicle 10. The seat position sensor 116 may be of any suitable type, for example, including rotation sensors, vision-sensing systems, etc. The vehicle 10 may include a computer 114 and a communications network 112. In the event of certain impacts, the impact sensor 118 may detect the impact and transmit a signal through the communications network 112 to the computer 114.

Figure 8:
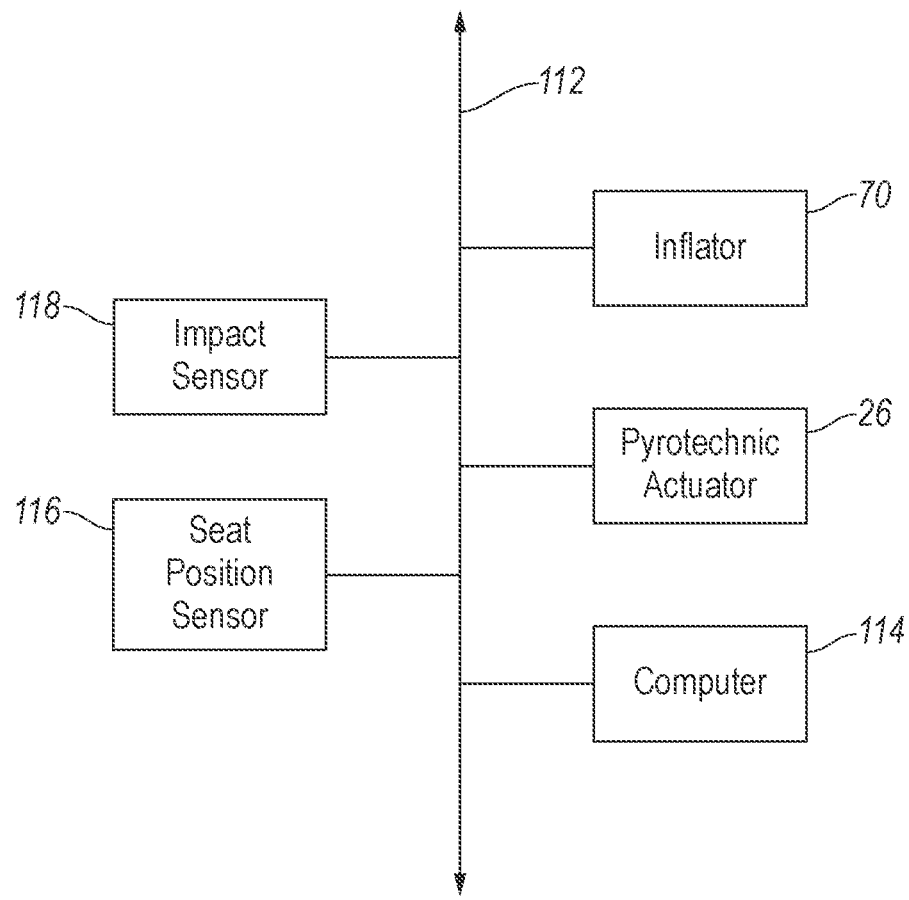
FIG. 8 is a block diagram of a system of the vehicle.

With reference to FIG. 8, the vehicle 10 may include a control system including the communications network 112 and the computer 114, e.g., a restraints control module. The communications network 112 may be a controller area network (CAN) bus, ethernet, wi-fi, local interconnect network, and/or by any other wired or wireless communications network 112. The computer 114 may be in communication with the impact sensor 118 and the inflator 70 and/or the actuator via the communications network 112.

The computer 114 may be a microprocessor-based controller. The computer 114 may include a processor, a memory, etc. The memory of the computer 114 may store instructions executable by the processor as well as data and/or databases. The computer 114 is programmed to perform the method shown in FIG. 9, i.e., the memory stores instructions executable by the processor to perform the elements of the method shown in FIG. 9. Use of "in response to," "based on," and "upon determining" herein indicates a causal relationship, not merely a temporal relationship.

The computer 114 may be programmed to identify certain impacts to the vehicle 10. For example, the computer 114 may determine that certain vehicle impact has occurred based on information received from the impact sensor 118 via the communications network 112.

In response to the identification of certain vehicle impacts, the computer 114 is programmed to activate the pyrotechnic actuator 26, as shown in to move the panel 24 to the deployed position. This raises the panel 24 upwardly relative to the seatback frame 22, as described above. Also in response to identification of certain vehicle impacts, the computer 114 is programmed to activate the inflator 70 to inflate the airbag 28. The computer 114 may activate the inflator 70, for example, simultaneously with the activation of the pyrotechnic actuator 26 or after activation of the pyrotechnic actuator 26. In any event the airbag 28 is inflated after movement of the panel 24 initiates from the stowed position toward the deployed position.

Computing devices, such as the computer 114, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by the computer 114 (e.g., by a processor of the computer 114). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which the computer 114 can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
    a vehicle body defining an interior cabin having an occupant cabin and a cargo cabin;
    a seatback in the occupant cabin, the seatback having a seatback frame elongated along an upright axis;
    a panel elongated along the upright axis of the seatback frame;
    the panel being slidably engaged with the seatback frame, the panel being slidable relative to the seatback frame along the upright axis from a stowed position to a deployed position;
    the panel being stowed relative to the seatback frame in the stowed position and elongated away from the seatback frame along the upright axis between the occupant cabin and the cargo cabin in the deployed position, and
    a pyrotechnic actuator fixed to the seatback frame and operatively engaged with the panel to deploy the panel from the stowed position to the deployed position.

2. The vehicle of claim 1, further comprising an airbag supported by the panel, the airbag being inflatable toward the occupant cabin.

3. The vehicle of claim 2, wherein the panel is rigid relative to the airbag.

4. The vehicle of claim 2, further comprising a head restraint supported by the seatback, the airbag in the inflated position has an upper segment above the head restraint and two side segments extending downwardly from the upper segment along the head restraint.

5. The vehicle of claim 2, further comprising an inflator supported on the panel and in fluid communication with the airbag.

6. The vehicle of claim 5, further comprising a computer having a processor and a memory storing instructions executable by the processor to activate the pyrotechnic actuator to move the panel to the deployed position and to, after actuating the pyrotechnic actuator, activate the inflator to inflate the airbag to the inflated position.

7. The vehicle of claim 1, further comprising a track on the seatback frame and elongated along the upright axis, the panel being moveable along the track along the upright axis from the stowed position to the deployed position.

8. The vehicle of claim 1, further comprising an inner track fixed to one of the seatback frame and the panel and an outer track fixed to the other of the seatback frame and the panel, the inner track is slidably engaged with the outer track along the upright axis.

9. The vehicle of claim 8, wherein one of the inner track and the outer track includes a spring-loaded pin biased toward the other of the inner track and the outer track, and the other of the inner track and the outer track including a hole configured to receive the spring-loaded pin when the inner track is in the deployed position.

10. The vehicle of claim 8, wherein the inner track remains engaged with the outer track when the panel is in the deployed position.

11. The vehicle of claim 1, wherein the seatback includes a covering that conceals the panel when the panel is in the stowed position.

12. The vehicle of claim 1, further comprising:
    a second seatback adjacent the seatback, the second seatback having a second seatback frame elongated along an upright axis; and
    a second panel elongated along the upright axis of the second seatback frame, the second panel being slidable relative to the second seatback frame along the upright axis from a stowed position to a deployed position;
    the second panel being stowed relative to the second seatback frame in the stowed position and elongated away from the second seatback frame along the upright axis of the second seatback frame between the occupant cabin and the cargo cabin in the deployed position.

13. The vehicle of claim 12, wherein the panel and the second panel are aligned cross-vehicle between the occupant cabin and the cargo cabin in the deployed position.

14. The vehicle of claim 1, wherein the vehicle body includes a roof, the panel extending from the seatback frame towards the roof from the stowed position to the deployed position.

15. The vehicle of claim 1, wherein the panel includes an upper end and a lower end, the upper end being in the seatback in the stowed position and spaced from the seatback in the deployed position.

16. The vehicle of claim 15, further comprising a track between the panel and the seatback frame, the panel being slidable along the track from the stowed position to the deployed position, the lower end being engaged with the track in the deployed position.

\* \* \* \* \*